No. 759,247.  Patented May 10, 1904.

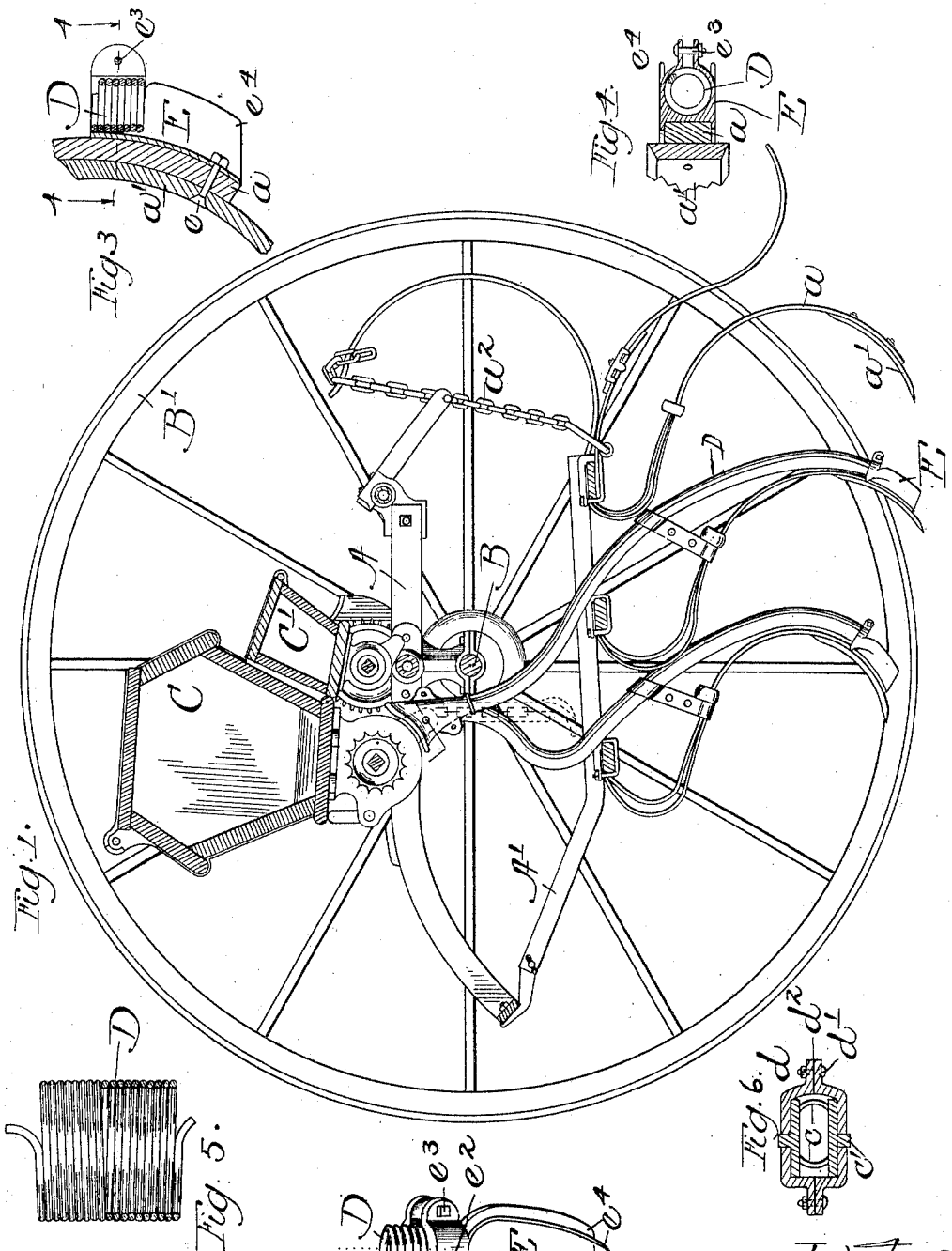

UNITED STATES PATENT OFFICE.

GAYLORD W. DENYES AND OWEN SCHUTT, OF CHICAGO, ILLINOIS, ASSIGNORS TO INTERNATIONAL HARVESTER COMPANY, A CORPORATION OF NEW JERSEY.

COMBINED SEEDER AND CULTIVATOR.

SPECIFICATION forming part of Letters Patent No. 759,247, dated May 10, 1904.

Application filed February 17, 1904. Serial No. 194,107. (No model.)

*To all whom it may concern:*

Be it known that we, GAYLORD W. DENYES and OWEN SCHUTT, mechanics, of the city of Chicago, in the county of Cook and State of Illinois, have invented a new and useful Improvement in a Combined Seeder and Cultivator, of which the following is a complete specification.

This invention is applicable to combination seeders and cultivators, and relates to the means for attaching the flexible extensible tubes connecting the outlets of the seed-hopper to the spring-teeth behind and near the points thereof.

The seeder to which the improvement is preferably applied is of the cultivator type, and consists, essentially, of a frame mounted upon supporting-wheels, said frame carrying a seed-hopper and having attached thereto the type of spring-teeth usually found on spring-tooth harrows and cultivators. The flexible extensible tubes must be rigidly secured at their lower ends to the teeth near the points of same and in a manner that will not interfere with the operation of the teeth in the soil. This is accomplished by the device shown in drawings, in which—

Figure 1 is a longitudinal section of a seeder of the cultivator type with flexible tubes attached setting forth the relative position and method of attachment of the various parts. Fig. 2 is a perspective of the shoe for connecting the flexible tube with the point of the tooth and is the chief element of the improvement. Fig. 3 is a longitudinal section of Fig. 2. Fig. 4 is a section as indicated by the line 4 4 of Fig. 3. Fig. 5 is a fragmentary detail view showing the construction of the flexible extensible tube connecting the outlet of the seed-hopper to the shoe shown in Fig. 2; and Fig. 6 is a transverse section taken on a plane lying immediately below the seed-hopper and transverse with respect to the seed-outlets thereof, showing the method of connecting the flexible conduits or tubes at their upper ends to the outlets of the seed-hopper.

Referring to the drawings, A designates the main frame of a seeder of the cultivator type and such as may be adapted to broadcast sowing. B is the axle on which the said main frame is mounted, and B' is one of the supporting-wheels journaled thereon. C is the seed-hopper, forming a receptacle from which the grain is fed by any of the usual feeding devices and which may be actuated in any suitable manner. The details are omitted of these and other parts not material to the invention, but which are necessary to illustrate the application thereof.

C' is the hopper for the reception of grass-seed, which is often distributed in connection with grain.

A' is the auxiliary frame, pivotally secured at its forward end to the main frame A and adjustably suspended therefrom at its rear end by means of the chain $a^2$. On this auxiliary frame is secured the spring cultivator-teeth $a$, which are provided with the soil-engaging points $a'$ on the lower or free ends thereof, the said points being shown reversible. These teeth are disposed in the usual zigzagged or staggered manner and operate to open the furrows in which the seed is deposited. The seed is conducted through the conduits D from the outlets of the hopper C to a position in the furrows immediately in the rear of and adjacent to the furrow-opening points $a'$ of the teeth $a$. These conduits or tubes are secured at their ends and may lead to all or only a portion of the spring-teeth, the arrangement depending upon how closely together it is desired to locate the drills or rows of seed and also on the relative number of the seed-outlets of the hopper and the spring-teeth. The conduits or seed-tubes D are preferably formed of wire wound into cylindrical forms by helical winding, thus rendering the tubes so formed both flexible and extensible, and thereby enabling them to adapt themselves to the necessary variations in their length caused by the spring of the teeth to which they are secured and by the vertical movement to which the auxiliary frame A', bearing said teeth, is subjected.

The connection of the seed-conduits to the seed-hopper is shown in Fig. 6, in which $d$ represents the two-part casting, the two parts being secured together by means of the rivets $d'$, passing through the lugs $d^2$. This two-part casting receives the upper end of the flexible tube D and is itself pivotally connected to the outlets of the seed-hopper by means of the trunnions $c'$ on the castings $c$ of the seed-hopper.

The securement of the lower ends of the conduits D to the spring-teeth is effected by means of a number of shoes E. This shoe, described individually, conforms on its front side to the curvature of the teeth $a$, to which it is secured by means of the bolt $e$ and the laterally-engaging lugs $e'$. The casting E terminates above in the clip portion $e^2$, which is adapted to receive the lower end of the flexible tubes D. There is sufficient spring in the clip, since it is split, to enable the tube D to be tightly secured by means of the bolt $e^3$. The lower end of the shoe E is open in the rear, the lower ends of the sides $e^4$ $e^4$ extending rearward horizontally and substantially parallel. Such a construction will result in producing a furrow of considerable width, and the sides $e^4$ will press the sides of the furrow back and hold it open for an interval of time sufficient to allow the seed to be well distributed over the entire width of the furrow.

What we claim as our invention, and desire to secure by Letters Patent, is—

1. In a seeder, in combination, a seed-hopper, spring cultivator-teeth, flexible extensible tubes connecting at their upper ends with the outlets of said seed-hopper, and shoes for connecting the lower end of said tubes with the said cultivator-teeth, said shoes engaging the lower end of said flexible tubes and being themselves secured to the rear side of said spring-teeth and at a position near the points thereof, substantially as described.

2. In a seeder, in combination, a seed-hopper, spring cultivator-tubes, flexible extensible tubes connecting at their upper ends with the outlets of said seed-hopper, and shoes for connecting the lower ends of said tubes with the said cultivator-teeth said shoes having formed on their upper ends clips for engaging and securing said flexible extensible tubes and being themselves releasably secured to the rear side of said spring-teeth and at a position near the points thereof, substantially as described.

3. In a seeder, a shoe consisting of an upper clip portion for connecting with the seed-conduit and a lower furrow-forming portion extending downwardly to a position near the point of the spring-tooth to which it is secured, of a width corresponding to the width of the tube and having rearwardly-extending parallel sides substantially as described.

GAYLORD W. DENYES.
        OWEN SCHUTT.

Witnesses:
    RICHARD BUTLER,
    A. L. JOHNSON.